US012615409B2

(12) United States Patent
Lee

(10) Patent No.: US 12,615,409 B2
(45) Date of Patent: Apr. 28, 2026

(54) VIRTUAL SET-TOP BOX USING SMART DEVICE AND METHOD OF OPERATING THE SAME

(71) Applicant: UIF (University Industry Foundation), Yonsei University, Seoul (KR)

(72) Inventor: Chul Hee Lee, Goyang-si (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 18/964,302

(22) Filed: Nov. 29, 2024

(65) Prior Publication Data

US 2025/0184566 A1     Jun. 5, 2025

(30) Foreign Application Priority Data

Dec. 1, 2023     (KR) ........................ 10-2023-0171963

(51) Int. Cl.
*H04N 21/4363*          (2011.01)
(52) U.S. Cl.
CPC ............................ *H04N 21/43635* (2013.01)

(58) Field of Classification Search
CPC ................................................. H04N 21/4363
See application file for complete search history.

(56) References Cited

U.S. PATENT DOCUMENTS

2020/0236432 A1 * 7/2020 Jenkin .................. H04N 21/631
2022/0078504 A1 * 3/2022 Ahn ...................... H04N 21/422

FOREIGN PATENT DOCUMENTS

KR     10-2010-0100522 A     9/2010
KR     10-2021-0088981 A     7/2021

* cited by examiner

*Primary Examiner* — Michael H Hong

(57)          ABSTRACT

A virtual set-top box system includes a smart device in which a service app for a set-top box is installed and driven, a receiving sensor configured to detect a wireless signal transmitted from a remote control, and an interface converter configured to convert media information applied through an interface of the smart device according to an interface of a TV and transmit the converted media information, and convert a signal detected and transmitted by the receiving sensor to a signal of the interface of the smart device and transmit the converted signal to the smart device.

8 Claims, 5 Drawing Sheets

VIRTUAL SET-TOP BOX USING SMART DEVICE AND METHOD OF OPERATING THE SAME

CROSS-REFERENCE TO RELATED APPLICATION

The present application claims the benefit of priority under 35 U.S.C. § 119(a) to Korean Patent Application No. 10-2023-0171963, filed on Dec. 1, 2023 in the Korean Intellectual Property Office, the entire disclosure of which is incorporated herein by reference.

BACKGROUND

1. Field of the Invention

The present disclosure relates to a virtual set-top box and a method of operating the same, and more specifically, to a virtual set-top box using a smart device and a method of operating the same.

2. Discussion of Related Art

A set-top box is a separate terminal that receives various media signals that a TV cannot receive directly and converts the media signals into signals that the TV can receive. The set-top box is not only an expensive device, but it also needs to be individually provided for each TV. Therefore, when multiple TVs are present in each household, it becomes expensive to provide set-top boxes for all TVs.

The cost required for these set-top boxes causes inequality in media information accessibility depending on income level. In particular, in the case of developing countries, this cost may cause a considerable burden related to purchasing a set-top box for each TV. Therefore, a set-top box that can be manufactured at a low cost is desirable.

SUMMARY

The present disclosure is directed to providing a virtual set-top box made at a low cost using a function of a smart device, and a method of operating the same.

The present disclosure is also directed to providing a virtual set-top box and a method of operating the same, which are capable of generating additional revenue and conserving the environment, by recycling an unused smart device to make a set-top box, which may be discarded.

A virtual set-top box according to one embodiment of the present disclosure includes a smart device in which a service app for the set-top box is installed and driven, a receiving sensor configured to detect a wireless signal transmitted from a remote control, and an interface converter configured to convert media information applied through an interface of the smart device according to an interface of a TV and transmit the converted media information to the TV and convert a signal detected and transmitted by the receiving sensor to a signal of the interface of the smart device and transmit the converted signal to the smart device.

The interface converter may supply power supplied from the TV, to which the interface converter is connected, to the smart device and the receiving sensor.

The interface converter may be connected in a wired manner according to the interface of each of the smart device and the TV.

The interface converter may convert a media signal transmitted to a universal serial bus (USB)-C interface of the smart device into a signal of a high-definition media interface (HDMI) of the TV.

The smart device may be connected to a service server that provides a set-top box service through a wireless network using a built-in wireless communication module.

The interface converter may be connected to a wired network, and the smart device may be connected to a service server that provides the set-top box service through the interface converter.

A method of operating a virtual set-top box, which is performed by a processor included in a smart device, according to another embodiment of the present disclosure includes driving a service app for a set-top box installed in the smart device, connecting the smart device to a service providing server using the service app that is driven, receiving media information from the connected service providing server when a receiving sensor that detects a wireless signal transmitted from a remote control transmits a service request command through an interface converter connected to the smart device, a TV, and the receiving sensor in a wired manner, and transmitting the received media information to the interface converter and converting the media information into a signal according to an interface of the TV in the interface converter.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, specific embodiments according to embodiments of the present disclosure will be described with reference to the accompanying drawings. The following detailed description is provided to help provide a comprehensive understanding of the methods, devices, and/or systems described herein. However, the detailed description is merely exemplary, and the present disclosure is not limited thereto.

In describing the embodiments of the present disclosure, when it is determined that a detailed description of known technologies related to the present disclosure may unnecessarily obscure the gist of the embodiments, the detailed description thereof will be omitted. In addition, the terms described below are the terms defined in consideration of functions in the present disclosure, which may vary depending on the intention, custom, etc. of a user or an operator. Therefore, the definitions should be determined based on the contents provided throughout the specification. The terms used in the detailed description are only for the purpose of describing certain embodiments herein and should never be limited. Unless clearly used otherwise, expressions in the singular form include plural meanings. In this description, expressions such as "including" and "having" are intended to indicate certain characteristics, numbers, steps, operations, elements, parts, or combinations thereof and should not be construed to exclude the presence or possibility of one or more other characteristics, numbers, steps, operations, elements, parts, or combinations thereof other than those described. In addition, terms such as "part," "unit," "module," and "block" described in the specification mean a unit for processing at least one function or operation, which may be implemented as software, hardware, or a combination of software and hardware.

Figure 1:
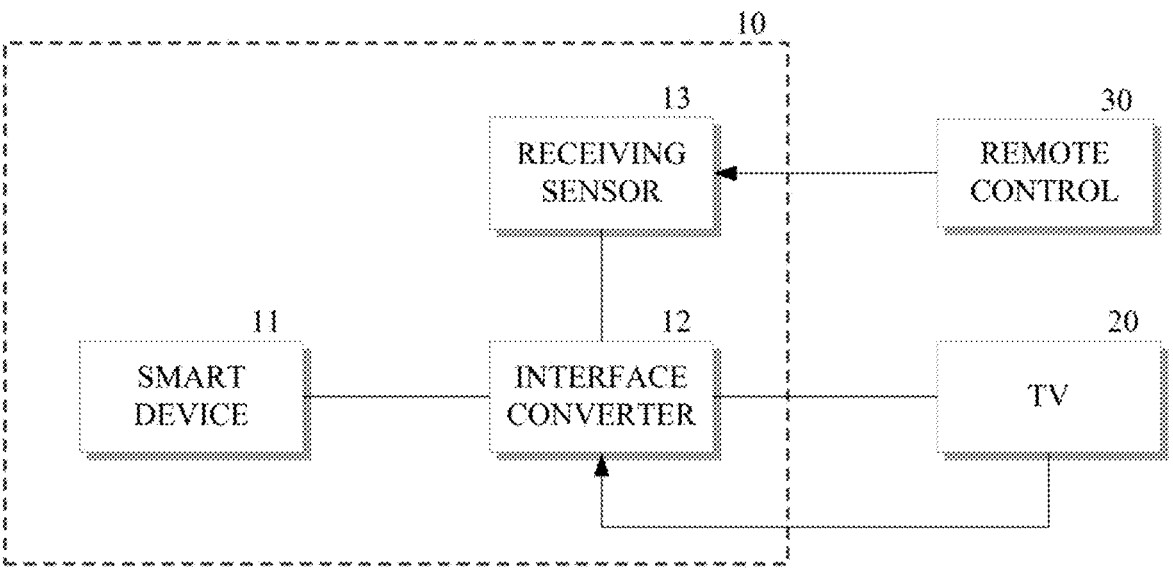
FIG. 1 illustrates a schematic configuration of a virtual set-top box according to an embodiment of present disclosure.

FIG. 1 illustrates a schematic configuration of a virtual set-top box according to one embodiment.

Referring to FIG. 1, a virtual set-top box 10 of the present disclosure includes a smart device 11, an interface converter 12, and a receiving sensor 13.

The smart device 11 is a device in which an app for a set-top box is installed and which has a built-in wireless communication module to receive media information such as Internet protocol TV (IPTV) or over-the-top (OTT) provided by service providers through a wireless network such as Wi-Fi and transmits the received media information to the interface converter 12.

Conventionally, service providers mainly provide media services using cable networks. However, since media services through the cable networks have a disadvantage of basically providing only one-way services, many service providers such as those providing IPTV or OTT currently provide video on demand (VOD) services based on Internet networks as main services. In other words, mainstream platforms for media services have shifted from the cable networks to Internet networks.

Meanwhile, due to the rapid development of smart devices, many smart phones, tablets, and the like that operate normally without hardware malfunctions are not being used because they do not provide the performance that meets the user's needs. In particular, as users repeatedly upgrade to new smart devices every few years, many smart devices are not being used. In addition, since the cost is incurred to discard unused smart devices, many users currently keep old smart phones without discarding the old smart devices even though the users do not use the old smart phones. However, even when the smart devices are not currently being used, the smart devices are very high-performance devices compared to general household electronic devices and have a capability to process media information provided by service providers. In other words, even though the smart devices do not meet the user's demands such as game playing or media editing that require high computing power or performing multiple multi-task operations, the smart devices still have sufficient computing power to process high-quality media information such as video streaming.

In particular, the smart device 11 may have various apps provided by the service providers installed therein to easily process various services provided by the service providers. In other words, there is an advantage in that services provided by each service provider in a customized manner can be used through the installed apps regardless of the service provider.

In addition, the smart device 11 may basically support wireless networks such as Wi-Fi, 4G, or 5G in terms of hardware and thus can easily connect to the Internet networks even without a wired connection. In addition, since the smart devices also support a wired interface terminal such as a universal serial bus (USB) type C (hereinafter referred to as a USB-C), information received through a wireless network may be transmitted through a wired interface. Among USB interfaces, the USB-C has a miniaturized terminal that enables high-speed transmission according to the specifications of USB 3.1 or higher. Therefore, the USB-C may transmit not only high-definition media data of a full-high definition (FHD) level, but also ultra-high-definition media data of a 4K level without interruption. In other words, it means that the USB-C port may be used as a device that may use media services without any additional hardware component.

Therefore, here, the unused smart device is used as an image processing module to make a set-top box.

However, there are several limitations to using the smart device 11 as the virtual set-top box 10. As described above, the set-top box is a device that receives media information that a TV cannot directly process and converts the received media information so that the TV 20 may output the media information, and even when the smart device processes the media information provided by service providers, the set-top box needs to transmit the media information to the TV 20. However, an interface, a USB-C interface of the smart device 11 may not be directly connected to most TVs 20. Therefore, the interface converter 12 is included.

The interface converter 12 compensates for an interface difference between the interface of the smart device 11 and an interface of the TV 20. The interface converter 12 may be implemented, for example, as a USB-C to HDMI converter for converting data transmitted from the USB-C interface of the smart device 11 to data of a high-definition multimedia interface (HDMI), which is an interface of the TV 20.

Meanwhile, most set-top boxes are used together with a remote control 30 to improve user convenience. Typically, the set-top box may transmit the received media information to the TV 20 in a wired manner and thus needs to be located close to the TV 20. Therefore, since a viewer who watches media at a distance from the TV 20 cannot directly control the set-top box easily, the remote control 30 is provided together to remotely control the set-top box. However, the smart device 11 has no sensor for receiving a signal from the remote control 30. Therefore, the virtual set-top box 10 of the present disclosure includes the receiving sensor 13 for receiving the signal transmitted from the remote control 30.

The receiving sensor 13 detects the signal received from the remote control 30 and transmits the detected signal to the interface converter 12. Therefore, the interface converter 12 converts the signal transmitted from the receiving sensor 13 to be suitable for the interface (i.e., the USB-C interface) of the smart device 11 and transmits the converted signal to the smart device 11 so that the smart device 11 performs an operation corresponding to the signal transmitted from the remote control 30. The receiving sensor 13 may be implemented, for example, using an infrared sensor (IR sensor), Bluetooth, Wi-Fi Direct, etc.

In other words, the interface converter 12 not only converts the interface of the smart device 11 into the interface of the TV 20, but also converts the signal transmitted from the receiving sensor 13 into the signal corresponding to the interface of the smart device 11.

In addition, the interface converter 12 may not only drive the connected receiving sensor 13 by receiving a power voltage, but also supply the supplied power voltage to the smart device 11. The smart device 11 is basically a portable terminal with a built-in battery, has no power supply unit, and receives power mostly through the USB-C interface. Therefore, the interface converter 12 may supply power to the smart device 11 through the interface of the connected smart device 11.

In the present disclosure, the virtual set-top box 10 may further have a separate power supply module (not illustrated) to supply power to the interface converter 12. However, the interface converter 12 and the receiving sensor 13 require only very little power, and the smart device 11 is also basically a portable device and thus is designed to consume low power. In addition, the USB interface is conventionally used to supply power to the smart device 11. Therefore, the interface converter 12 can be not only driven by the power voltage received from the connected TV 20, but also can transmit the received power voltage to the smart device 11 and the receiving sensor 13 to enable operations without a separate power supply module.

In the present disclosure, since the virtual set-top box 10 includes the smart device 11, the interface converter 12, and the receiving sensor 13 as described above, the receiving sensor 13 may be purchased at a very low price on the market, and the interface converter 12 only need to perform the simple function of converting the interface, thus the virtual set-top box 10 can be manufactured at a very low cost. In some cases, the USB-C to HDMI converter currently distributed at a low price on the market may be used by making some design modifications. In addition, since the smart device 11 recycles a device, which is not being used and may be discarded as described above, almost no expense is incurred. In particular, when the user currently has an unused smart device, the unused smart device may be used for the virtual set-top box 10, thereby saving even more cost. In addition, when users collect unused smart devices and use them to configure the virtual set-top box 10, it would be beneficial to the environment through resource recycling, and additional value can be generated through exports to developing countries.

In addition, many households currently have multiple TVs. Most conventional set-top boxes are connected to a network through a wired LAN and the set-top boxes and the TVs 20 are connected to wired interfaces such as an HDMI. Moreover, a typical set-top box needs to be connected to a home Internet distributor and the wired network. Therefore, the installation work of the wired LAN is required, thereby incurring additional cost. Moreover, LAN cables cross various places in a home ruins aesthetics. In addition, since the LAN cables need to be reinstalled every time the TV 20 is moved, it is not easy to change the location of the TV 20.

In contrast, since the smart device 11 may be connected to the Internet network in a wireless manner to receive media services, the virtual set-top box 10 of the present disclosure can easily provide services regardless of the location of the TV 20.

In the illustrated embodiment, the components may have different functions and capabilities other than those described above and may include additional components that have not been described. In addition, in one embodiment, each component may be implemented using one or more physically separated devices or implemented by a combination of the one or more processors and software. Moreover, it may not be clearly distinguished by specific operations unlike the illustrated example.

In addition, the virtual set-top box illustrated in FIG. 1 may be implemented in a logic circuit by hardware, firmware, software, or a combination thereof and may be implemented using a general-purpose or special-purpose computer. The device may be implemented using a hardwired device, a field programmable gate array (FPGA), an application specific integrated circuit (ASIC), etc. In addition, the device may be implemented as a system on chip (SOC) including one or more processors and controllers.

In addition, the virtual set-top box may be installed in a computing device or server provided with hardware elements in the form of software, hardware, or a combination thereof. The computing device or the server may be various devices including all or some of a communication device such as a communication modem for performing communication with various devices or a wired/wireless communication network, the memory in which data for executing programs is stored, a microprocessor for executing programs to perform calculations and instructions, etc.

Figure 2:
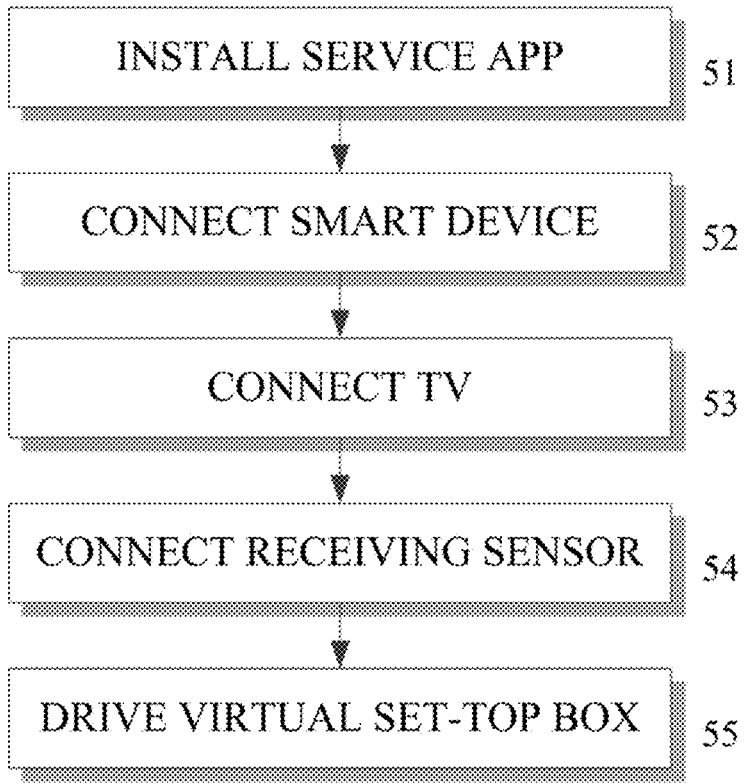
FIG. 2 illustrates a method of constructing the virtual set-top box according to an embodiment of present disclosure.

FIG. 2 illustrates a method of constructing the virtual set-top box according to one embodiment.

The virtual set-top box illustrated in FIG. 1 may be made as the virtual set-top box 10 by an individual user with an unused smart device using the interface converter 12 and the receiving sensor 13.

To make the virtual set-top box 10, a service app is first installed in the smart device 11 to be used as a control module of the virtual set-top box 10 (51). Here, the service app may be a dedicated service app developed separately for the virtual set-top box or may be a service app provided by each service provider.

In addition, the smart device 11 is connected to the interface converter 12, which is a component of the interface chain (52). In addition, the TV 20 is connected to the interface converter 12 (53). The smart device 11 receives power through the interface converter 12, and at this time, the interface converter 12 may supply the power supplied from the TV 20 to the smart device 11.

The receiving sensor 13 is connected to the interface converter 12 so that the remote control may be used (54).

When the smart device 11 in which the service app is installed, the receiving sensor 13, and the TV 20 are connected through the interface converter 12, the virtual set-top box 10 is assembled, and the virtual set-top box 10 is driven using the remote control 30 (55).

The above description has been made assuming that an individual with the smart device 11 makes the virtual set-top box 10, but as described above, the virtual set-top box 10 using the smart device 11 may be used as an item for generating additional revenue. However, to make multiple virtual set-top boxes 10, it is inefficient to manually make the virtual set-top boxes 10. Therefore, the method of manufacturing the virtual set-top box of FIG. 2 may be performed using a computer-based automated manufacturing system. In this case, although the process of connection to the TV 20 may be omitted, a process of manufacturing a separate housing to make the virtual set-top boxes 10 as a single product and installing the smart devices 11, the interface converters 12, and the receiving sensors 13 in the manufactured housing may be added.

Figure 3:
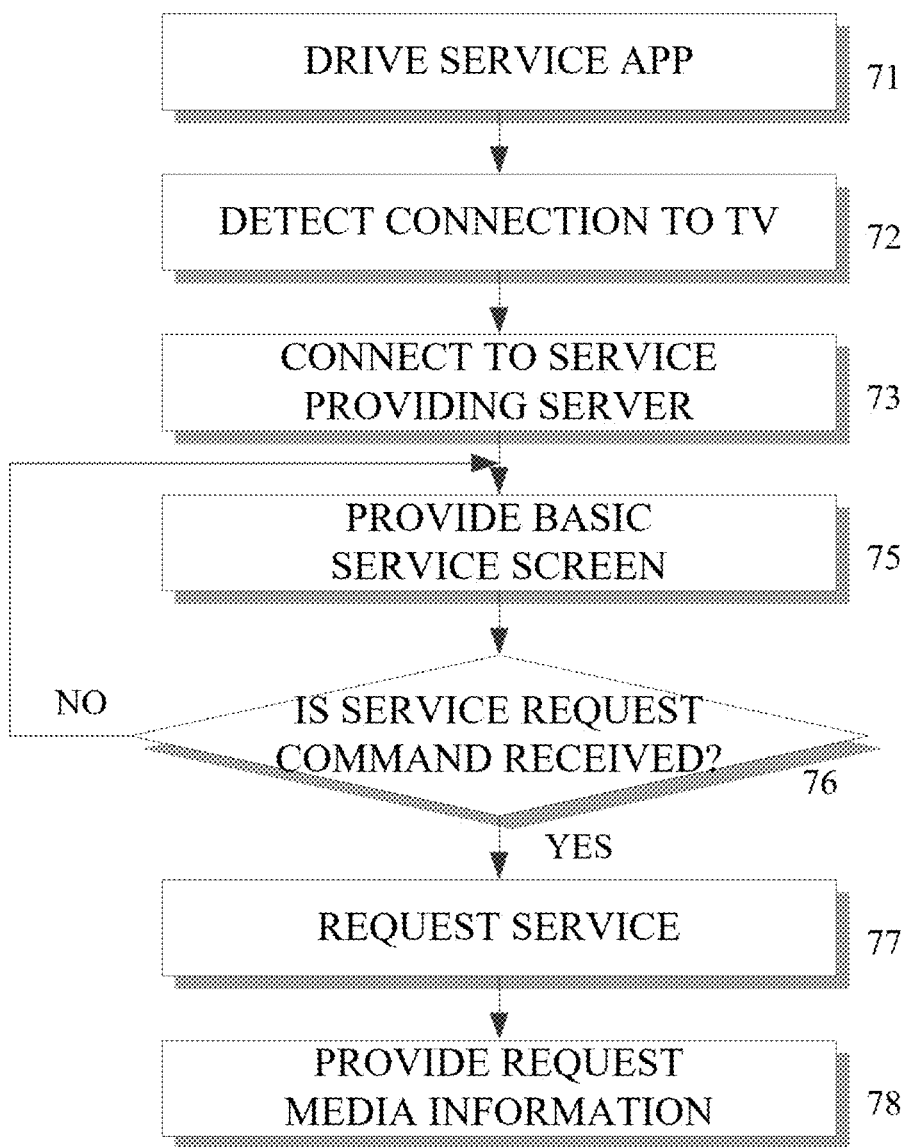
FIG. 3 illustrates a method of operating the virtual set-top box according to an embodiment of present disclosure.

FIG. 3 illustrates a method of operating the virtual set-top box according to one embodiment.

Referring to FIG. 3, first, when a driving command is applied to the smart device 11 of the virtual set-top box 10 through the receiving sensor 13, the installed service app is driven (71). Then, the connection of the TV 20 is detected through the interface converter 12 that compensates for an interface difference between the smart device 11 and the TV 20 (72). When the TV 20 is connected, the smart device 11 is connected to a service providing server using the service app that is driven (73). In this case, the smart device 11 may be connected to the service providing server via a wireless network such as Wi-Fi. When the smart device 11 is connected to the service providing server, the smart device 11 receives a basic service screen from the service providing server and transmits the basic service screen to the TV 20 through the interface converter 12 so that a set initial screen such as the basic service screen or a screen of the channel viewed last is sent to the TV. The interface converter 12 converts the initial screen transmitted from the smart device 11 into a signal of an interface that the TV 20 can handle and transmits the signal. For example, the interface converter 12 can convert the initial screen transmitted from the smart device 11 to the USB-C interface into a signal of an HDMI interface that the TV 20 can handle and transmit the signal.

In addition, it is determined whether the interface converter 12 receives a service request command transmitted from the remote control 30 through the receiving sensor 13 connected with the smart device 11 and the TV (76). The interface converter 12 converts the signal received from the receiving sensor 13 to conform interface specifications of the connected smart device 11 and transmits the converted signal to the smart device 11.

When receiving the service request command, the smart device 11 requests the corresponding service from the connected service providing server (77). In addition, when media information is received according to the requested service, the received media information is transmitted to the TV through the interface converter 12 so that the TV 20 outputs the transmitted media information (78). Here, the interface converter 12 may also convert the media information transmitted from the smart device 11 into a signal of an interface that the TV 20 can handle and transmit the signal.

Although each process is described as being executed sequentially in FIGS. 2 and 3, it is merely described in an exemplary manner, and those skilled in the art can modify and change the present disclosure in any of various ways and adopt the modifications and changes by changing the order described in FIG. 3 to execute each process, execute one or more processes in parallel, or add another process without departing from the essential characteristics of the embodiment of the present disclosure.

Figure 4:
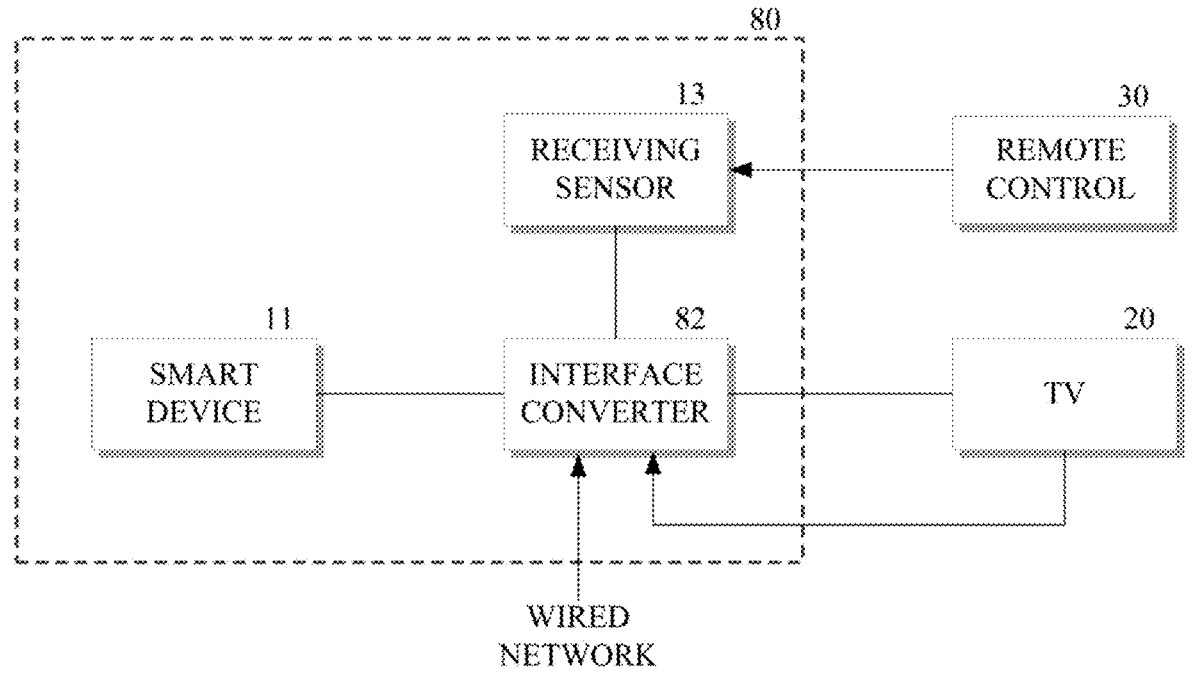
FIG. 4 illustrates a schematic configuration of the virtual set-top box according to an embodiment of present disclosure.

FIG. 4 illustrates a schematic configuration of a virtual set-top box according to another embodiment.

Since the configuration of a virtual set-top box 80 illustrated in FIG. 4 is basically the same as the virtual set-top box 10 illustrated in FIG. 1, the same components are denoted with the same symbols. However, in the virtual set-top box 80 of FIG. 4, the interface converter 82 may be further connected to a wired network. Since the interface converter 82 and the smart device 11 are connected through a wired interface terminal and the wired network may be further connected to the interface converter 82, the smart device 11 may be connected to the wired network through the interface converter 82. In this case, when the wireless network such as Wi-Fi is not installed or the wired network has already been installed in a home, the smart device 11 may be easily and stably connected to the network.

Figure 5:
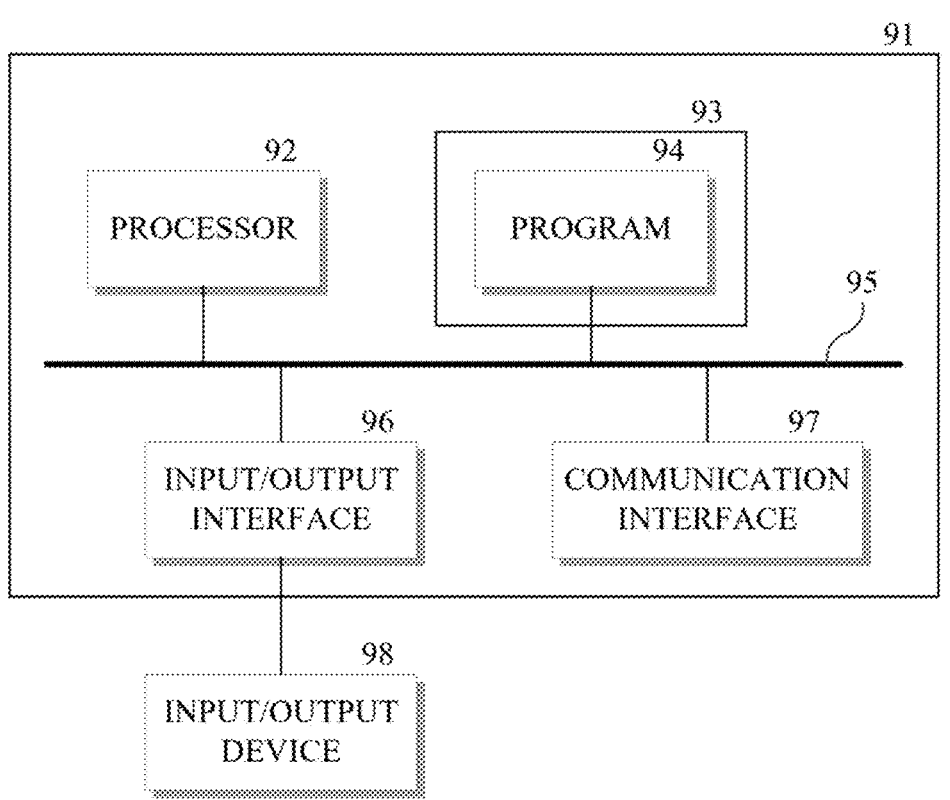
FIG. 5 is a view for describing a computing environment including a computing device according to an embodiment of present disclosure.

FIG. 5 is a view for describing a computing environment including a computing device according to one embodiment.

In the illustrated embodiment, components may have different functions and capabilities other than those described below and may include additional components other than those described below. The illustrated computing environment 90 may include a computing device 91 to perform the method of constituting and operating the virtual set-top box illustrated in FIGS. 2 and 3. In one embodiment, the computing device 91 may be one or more components included in the virtual set-top box illustrated in FIG. 1, and in particular, may be the smart device 11 in this case. In addition, computing device 91 may be a part of an automated system for constituting the virtual set-top box illustrated in FIG. 1.

The computing device 91 includes at least one processor 92, a computer-readable storage medium 93, and a communication bus 95. The processor 92 may allow the computing device 91 to operate according to the above-described exemplary embodiments. For example, the processor 92 may execute one or more programs 94 stored in the computer-readable storage medium 93. One or more programs 94 may include one or more computer-executable commands, and when executed by the processor 92, the computer-executable commands may be configured so that the computing device 91 performs the operations according to the exemplary embodiments.

The communication bus 95 interconnects various other components of the computing device 91 in addition to the processor 92 and the computer-readable storage medium 93.

The computing device 91 may also include one or more input/output interfaces 96 and one or more communication interfaces 97 that provide interfaces for one or more input/output devices 98. The input/output interfaces 96 and the communication interfaces 97 are connected to the communication bus 95.

The input/output devices 98 may be connected to other components of the computing device 91 through the input/output interfaces 96. The exemplary input/output devices 98 may include input devices such as pointing devices (a mouse, a trackpad, etc.), keyboards, touch input devices (a touchpad, a touchscreen, etc.), voice or sound input devices, various types of sensor devices and/or photographing devices, and/or output devices such as display devices, printers, speakers, and/or network cards. The exemplary input/output devices may be included inside the computing device 91 as components included in the computing device 91 or may be connected to the computing device 91 as separate devices that are distinguished from the computing device 91.

According to the virtual set-top box and the method of operating the same of the present disclosure, it is possible to conserve the environment and generate additional revenue by simply manufacturing a set-top box at a low cost using the functionality of a smart device that is not being used and is discarded.

Although the present disclosure has been described above in detail through representative embodiments, those skilled in the art will understand that various modifications and other equivalent embodiments are made possible therefrom. Therefore, the true technical scope of the present disclosure should be determined by the technical spirit of the appended claims.

What is claimed is:

1. A virtual set-top box comprising:
   a smart device in which a service app for a set-top box is installed and driven;
   a receiving sensor configured to detect a wireless signal transmitted from a remote control; and
   an interface converter connected to the smart device, a TV, and the receiving sensor,
   where the interface converter is configured to convert a media signal received through a universal serial bus (USB)-C interface of the smart device into a high-definition multimedia interface (HDMI) signal and output the HDMI signal to the TV, convert a control signal detected and transmitted by the receiving sensor into a signal of the USB-C interface and transmit the converted signal to the smart device; and supply power received from the TV to both the smart device and the receiving sensor.

2. The virtual set-top box of claim 1, wherein the interface converter is connected in a wired manner according to an interface of each of the smart device and the TV.

3. The virtual set-top box of claim 1, wherein the smart device is connected to a service server that provides a set-top box service through a wireless network using a built-in wireless communication module.

4. The virtual set-top box of claim 1, wherein the interface converter is connected to a wired network, and the smart device is connected to a service server that provides a set-top box service through the interface converter.

5. A method of operating a virtual set-top box, which is performed by a processor included in a smart device, the method comprising:

driving a service app for a set-top box installed in the smart device;

connecting the smart device to a service providing server using the service app that is driven;

receiving, from an interface converter, a control signal generated by converting a wireless signal detected by a receiving sensor into a signal of a universal series bus (USB)-C interface;

receiving media information from the connected service providing server in response to the control signal; and transmitting the received media information to the interface converter, wherein the interface converter:

converts the transmitted media information into a high-definition multimedia interface (HDMI) signal and outputs the HDMI signal to a TV; and supplied power received from the TV to both the smart device and the receiving sensor.

6. The method of claim 5, wherein the connecting of the smart device to the service providing server includes connecting the smart device to a service server that provides a set-top box service through a wireless network using a built-in wireless communication module.

7. The method of claim 5, wherein the connecting of the smart device to the service providing server includes connecting the smart device to a service server that provides a set-top box service through the interface converter connected to a wired network.

8. The method of claim 5, wherein the connecting of the smart device to the service providing server includes:

determining whether the TV is connected through the interface converter; and connecting the smart device to the service providing server when it is determined that the TV is connected.

* * * * *